UNITED STATES PATENT OFFICE.

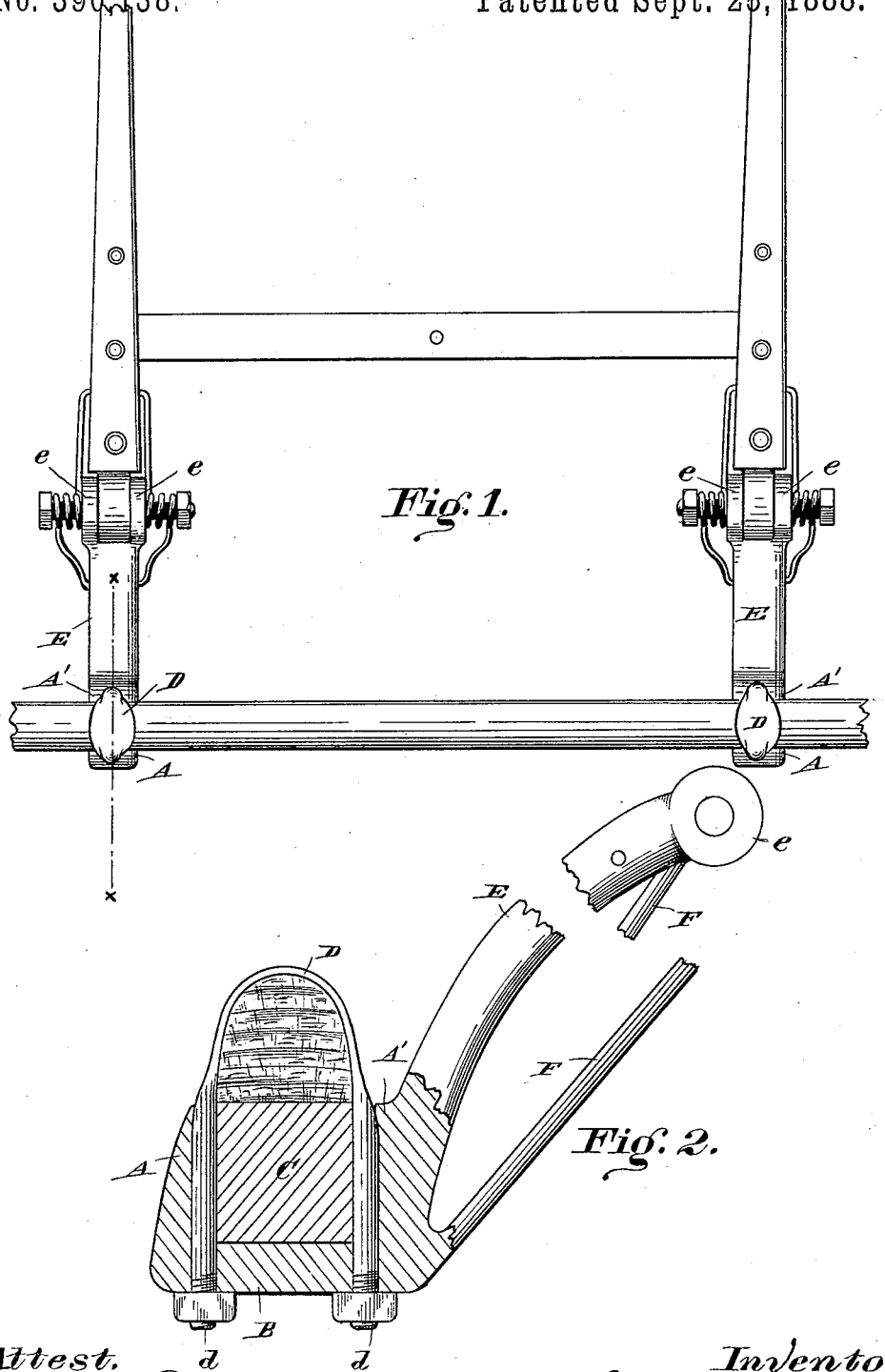

GEORGE H. PIGMAN, OF READING, OHIO.

AUXILIARY SHAFT FOR VEHICLES.

SPECIFICATION forming part of Letters Patent No. 390,138, dated September 25, 1888.

Application filed January 11, 1888. Serial No. 260,443. (No model.)

*To all whom it may concern:*

Be it known that I, GEORGE H. PIGMAN, a citizen of the United States, and a resident of Reading, Hamilton county, Ohio, have invented certain new and useful Improvements in Auxiliary Shafts for Vehicles and Connections for Same, of which the following is a specification.

The object of my invention is to provide auxiliary shafts to be attached to the front axle of a vehicle, by means of which the shafts proper may be coupled or connected to the vehicle at a distance from said axle, and thereby afford a better opportunity for attaching a suitable shaft-support—one form of said support being shown in Figure 1, and for which I have made application for Letters Patent, Serial No. 260,442.

In the accompanying drawings, forming part of this application, Fig. 1 is a top view of my improved auxiliary shafts and connections in position, part of the shafts proper being broken away. Fig. 2 is an enlarged sectional view taken through the front axle, clip, and lower portion of one of the auxiliary shafts, showing one form of connecting same to the axle, said view being taken at the line $x$ $x$ at left hand in Fig. 1, part of said auxiliary shaft being broken away.

The preferable mode of connecting said auxiliary shafts to the front axle of a vehicle is as follows: The lower end portion of each of the shafts E is so constructed by means of the flanges A and A' and bottom portion, B, that there will be formed a box shaped bearing, in which the axle C may rest. The inner faces of said flanges are parallel and at right angles to the inner face of the bottom portion, B, thus forming a bearing to fit the configuration of the axle.

The two extensions $d$ $d$ of the clip D are made to pass down the side of the axle through suitable grooves made in the inner faces of the flanges A A' and through the bottom portion, B. The clip D being placed over the top or wooden portion of the axle, and the extensions $d$ $d$ being securely fastened to the bottom portion by suitable nuts, the whole forms a compact, substantial, and reliable connection for said auxiliary shafts. The two flanges A and A' of the shafts, when secured to the axle in the manner aforementioned, form a rigid connection thereto. The configuration of said auxiliary shafts is substantially the same as the lower portion of the ordinary shafts now in use. The length of same is preferably about fifteen inches, but may be made of any desired length. The upper end portion of each shaft E is bifurcated, forming the two annular arms $e$ $e$, between which the shafts proper are pivoted, substantially as shown in Fig. 1. To afford strength to said auxiliary shafts, I have provided the stay-rods F, which latter are welded or suitably secured to the lower and upper portions of said shafts, as shown in Fig. 2.

The advantages of my invention are apparent. By the use of my auxiliary shafts the connection to the axle of a vehicle may be made rigid—an advantage not to be had by the use of the ordinary shafts now in use; also, better facility is afforded for the connection and application of anti-rattling couplings and shaft-supports, as aforementioned. The cost of manufacture is but a trifle more than in the shafts now generally in use, while the advantages obtained are far superior.

What I claim as new and of my invention, and desire to secure by Letters Patent, is—

1. A shaft-connection for vehicles, consisting of the auxiliary shafts E, rigidly attached to the front axle at rear of said shafts and pivotally connected at front to the rear of the shafts proper, said auxiliary shafts having the stay-rods F, substantially as set forth.

2. A shaft-connection consisting of the auxiliary shafts E, said shafts having at their rear ends the bottom portions, B, and flanges A A', and mechanism, substantially as shown, for connecting said bottom portions and flanges to the axle, in combination with the shafts proper pivotally connected to front of said auxiliary shafts, substantially as set forth.

GEORGE H. PIGMAN.

Attest:
WM. TUCKER,
W. T. HILL.